United States Patent Office

3,070,519
Patented Dec. 25, 1962

3,070,519
PROCESS FOR THE PURIFICATION OF p-XYLYLENE DICHLORIDE
Rudolf Lotz, Obernburg, Germany, assignor to Vereinigte Glanzstoff-Fabriken A.G., Wuppertal-Elberfeld, Germany
No Drawing. Filed Nov. 27, 1959, Ser. No. 855,491
Claims priority, application Germany Dec. 3, 1958
2 Claims. (Cl. 202—42)

This invention relates to a process for the purification of p-xylylene dichloride, especially for the purpose of obtaining a product of very high purity.

In the commercial production of p-xylylene dichloride, the crude product is contaminated with various by-products such as m- and o-xylylene dichloride, benzyl chloride, and diphenyl methane as well as unconverted reactants and inorganic components serving as catalysts, e.g. zinc chloride. However, an extremely pure product is required for further conversion of the p-xylylene dichloride into other useful products such as terephthalic acid.

One method of purifying p-xylylene dichloride has been by recrystallization from alcohols. This procedure, however, is relatively complicated and time consuming because the recrystallization must be repeated several times. Also, part of the product is lost in each recrystallization so that the yield of p-xylylene dichloride is reduced to the extent that the process is not economically feasible.

Purification of the p-xylylene dichloride by fractional distillation is impossible because the compound decomposes at its boiling temperature. Even if special precautions are taken, for example, by working in a vacuum and introducing an inert gas, it is still impossible to avoid decomposition or the splitting off of HCl from the desired product.

One object of the present invention is to provide an improved process for purifying p-xylylene dichloride such that this compound is obtained with a very high degree of purity and without a substantial loss in the yield.

Another object of the invention is to purify p-xylylene dichloride such that decomposition of the pure product can be avoided.

Still another object of the invention is to purify p-xylylene dichloride in a continuous process permitting a rapid and economical separation of the pure product from its crude mixture with various contaminants.

These and other objects and advantages of the invention will become more apparent upon a consideration of the following detailed disclosure taken in conjunction with the following flow sheet outlining the process of the invention:

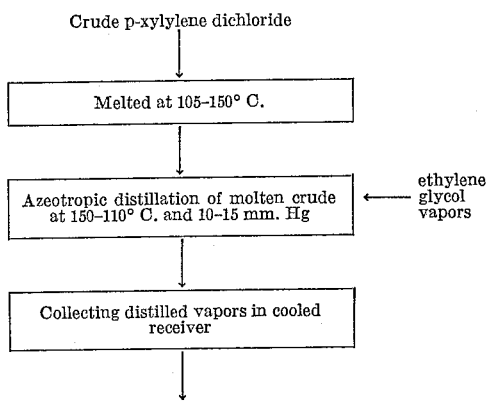

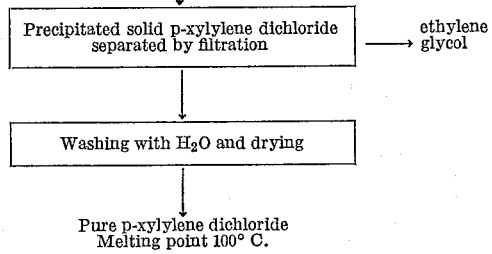

In accordance with the invention, it has now been found that an improved purification of a crude p-xylylene dichloride, as obtained by known processes, can be accomplished if the crude is heated to its molten state, preferably at a temperature between about 105° C. and 150° C., and the molten crude contacted with hot ethylene glycol vapors for azeotropic distillation at a temperature of 105° C. to 110° C., and an absolute pressure of 10 to 15 mm. Hg. The distilled vapors are collected in a cooled receiver in which the p-xylylene dichloride immediately appears as a solid and can be easily separated from the cooled liquid ethylene glycol. After repeated washing of the p-xylylene dichloride with distilled water and subsequent drying, it is precipitated in highly pure form. The ethylene glycol can be reused after a simple fractional distillation.

The molten crude p-xylylene dichloride should not be heated at temperatures above 150° C. or else decomposition can occur with a loss in the total yield. In the azeotropic distillation with ethylene glycol, a high vacuum corresponding to a pressure of 10–15 mm. Hg should be employed and those vapors collected which distill over at temperatures between about 105° C. and 110° C. In this way a maximum yield and highest purity of the product can be obtained.

After the distilled vapors are cooled, the solid p-xylylene dichloride is most easily separated from the liquid ethylene glycol by suction filtration, drawing off the liquid which can be recycled after a single distillation for reuse in the purification process. If the molten crude is conducted through a distillation zone in contact with the hot ethylene glycol vapors, a very effective continuous process is possible.

The invention is further illustrated by the following example in which percentages are by weight unless otherwise specified.

*Example*

The p-xylylene is prepared by reacting 78 grams benzene, 120 grams paraformaldehyde, 100 grams zinc chloride and 250 grams carbon tetrachloride as solvent with the introduction of a gas stream of HCl according to the known process. A reaction product of 500 grams is obtained which besides the solvent contains 90 grams of p-xylylene dichloride and the following impurities: 6% m- and o-xylylene dichloride, 16% benzyl chloride, 20% benzene, 8% diphenyl methane and inorganic compounds. The reaction product is separated by suction filtration as a crystalline sludge and made into a paste with cold methanol. The paste is subjected to suction filtration and the residue washed with water and dried to give a crude p-xylylene dichloride.

The main purification of this crude p-xylylene dichloride is carried out with a melting flask, a glycol evaporator and a cooled receiver. The crude p-xylylene dichloride is first melted in the flask at 135° C. and the apparatus is then placed under vacuum at an absolute pressure of 12 mm. Hg. Ethylene glycol is heated in the evaporator and hot vapors at 105° C. are conducted from the evaporator into the molten crude. An azeotropic mixture is thus distilled from the molten crude at 105° C. and 12 mm. Hg, and the distillate cooled in the receiver to normal or room temperature. In the cooled receiver, the p-xylylene dichloride precipitates in solid form and is separated from the ethylene glycol by suction filtration. The precipitate is then washed with distilled water to remove the last traces of ethylene glycol. After drying the washed product, 87.5 grams of pure p-xylylene dichloride are obtained with a sharp melting point of 100° C.

If the main purification is carried out under the same conditions by conducting the molten crude through an enclosed distillation vessel and in contact with the hot glycol vapors, a correspondingly pure product is obtained. By recycling the ethylene glycol which has been separated from the purified p-xylylene dichloride and distilled, an effective continuous process is carried out.

With the process of the present invention, p-xylylene dichloride can be obtained with a purity as high as 99.9%.

This pure product is eminently suitable for further conversion into terephthalic acid and there is only a minor loss of yield.

The invention is hereby claimed as follows:

1. A process for the purification of p-xylylene dichloride which comprises heating a crude p-xylylene dichloride containing impurities selected from the group consisting of m-xylylene dichloride, o-xylylene dichloride, benzyl chloride, benzene and diphenyl methane to form a molten crude at a temperature between about 105° C. and 150° C., contacting the crude melt with hot ethylene glycol vapors for azeotropic distillation at a temperature of about 105° C. to 110° C. and an absolute pressure of about 10 to 15 mm. Hg, and collecting the distilled vapors consisting essentially of ethylene glycol and p-xylylene dichloride in a cooled receiver.

2. A continuous process for the purification of p-xylylene dichloride which comprises conducting a molten crude p-xylylene dichloride containing impurities selected from the group consisting of m-xylylene dichloride, o-xylylene dichloride, benzyl chloride, benzene and diphenyl methane through a distillation zone maintained at a temperature of about 105° C. to 110° C. and under an absolute pressure of about 10 to 15 mm. Hg while contacting said molten crude with hot ethylene glycol vapors for azeotropic distillation, and collecting the distillate vapors consisting essentially of ethylene glycol and p-xylylene dichloride in a cooled receiver.

References Cited in the file of this patent

UNITED STATES PATENTS

| | | |
|---|---|---|
| 2,717,233 | Trotter | Sept. 6, 1955 |
| 2,814,649 | Pritchard | Nov. 26, 1957 |
| 2,850,542 | Heisenberg et al. | Sept. 2, 1958 |
| 2,971,865 | Metcalfe et al. | Feb. 14, 1961 |

OTHER REFERENCES

"Azeotropic Data," Horsley (June 1952, Washington, D.C.), p. 66.

UNITED STATES PATENT OFFICE
CERTIFICATE OF CORRECTION

Patent No. 3,070,519                      December 25, 1962

Rudolf Lotz

It is hereby certified that error appears in the above numbered patent requiring correction and that the said Letters Patent should read as corrected below.

Column 1, line 61, for "150-110° C." read -- 105-110° C. --

Signed and sealed this 1st day of October 1963.

(SEAL)
Attest:

ERNEST W. SWIDER                      DAVID L. LADD

Attesting Officer                      Commissioner of Patents